(12) United States Patent
Igari (10) Patent No.: US 12,539,931 B2
(45) Date of Patent: Feb. 3, 2026

(54) CONTROLLER AND CONTROL METHOD

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 18/691,124

(22) PCT Filed: Sep. 28, 2022

(86) PCT No.: PCT/IB2022/059223
§ 371 (c)(1),
(2) Date: Mar. 12, 2024

(87) PCT Pub. No.: WO2023/053022
PCT Pub. Date: Apr. 6, 2023

(65) Prior Publication Data
US 2024/0425135 A1    Dec. 26, 2024

(30) Foreign Application Priority Data

Sep. 28, 2021 (JP) .................................. 2021-157668

(51) Int. Cl.
*B62J 45/20* (2020.01)
(52) U.S. Cl.
CPC ..................... *B62J 45/20* (2020.02)
(58) Field of Classification Search
CPC ............. B62J 45/20; B60W 30/18109; B60W 2300/36; B60W 2420/905;
(Continued)

(56) References Cited

U.S. PATENT DOCUMENTS

2011/0246043 A1\* 10/2011 Maruyama ............. G08G 1/166
701/96
2012/0081544 A1\* 4/2012 Wee ...................... G01S 17/894
348/140
(Continued)

FOREIGN PATENT DOCUMENTS

CN 102205845 A * 10/2011 ............ B60W 30/17
CN 104192146 A * 12/2014 ............ B60W 30/14
(Continued)

OTHER PUBLICATIONS

English translation of WO 2020/234710 (Year: 2020).\*
International Search Report and Written Opinion for Application No. PCT/IB2022/059223 dated Dec. 16, 2022 (11 pages).

*Primary Examiner* — Joseph J Dallo
(74) *Attorney, Agent, or Firm* — Michael Best & Friedrich LLP (57) ABSTRACT

The present invention obtains a controller and a control method capable of improving safety of a lean vehicle. According to a controller (30) and a control method of the present invention, an execution section of the controller (30) executes a first operation. The first operation is an operation causing the lean vehicle (1) to execute a cruise control based on a positional relationship information that is information about a positional relationship between the lean vehicle (1) and a preceding vehicle preceding the lean vehicle (1). When a specified operation is performed by a rider of the lean vehicle (1) while the first operation is enabled by the rider, the execution section executes a second operation, the second operation is an operation that automatically stops the lean vehicle (1) regardless of the positional relationship information.

20 Claims, 3 Drawing Sheets

(58) Field of Classification Search
CPC ......... B60W 2520/16; B60W 2530/10; B60W 2540/10; B60W 2540/12; B60W 2540/14; B60W 2540/16; B60W 2552/40; B60W 2720/106; B60W 30/16
See application file for complete search history.

(56) References Cited

U.S. PATENT DOCUMENTS

| | | | | |
|---|---|---|---|---|
| 2012/0253629 | A1* | 10/2012 | Maruyama | B60W 30/16 |
| | | | | 701/96 |
| 2015/0149059 | A1* | 5/2015 | Choi | B60W 30/146 |
| | | | | 701/96 |
| 2018/0043793 | A1* | 2/2018 | Herb | B60W 10/08 |
| 2019/0001941 | A1 | 1/2019 | Westlund et al. | |
| 2019/0001976 | A1* | 1/2019 | Liu | B60W 50/085 |
| 2019/0176821 | A1* | 6/2019 | Hsu | B60W 30/16 |
| 2019/0256106 | A1* | 8/2019 | Lee | B60W 50/14 |
| 2020/0017085 | A1 | 1/2020 | Oshida | |
| 2020/0047756 | A1* | 2/2020 | Yoo | B60W 50/0098 |
| 2020/0331460 | A1* | 10/2020 | Igari | B60W 30/04 |
| 2020/0377165 | A1* | 12/2020 | Rienmueller | F21V 23/0442 |
| 2021/0046932 | A1* | 2/2021 | Kegelman | G08G 1/22 |
| 2021/0101596 | A1* | 4/2021 | Yan | B60W 40/107 |
| 2021/0197821 | A1* | 7/2021 | Valchok | B60W 30/18109 |
| 2021/0206365 | A1* | 7/2021 | Jang | B60W 10/02 |
| 2021/0206371 | A1* | 7/2021 | Jang | B60W 10/18 |
| 2021/0213932 | A1* | 7/2021 | Aggoune | B60W 50/0097 |
| 2021/0276552 | A1* | 9/2021 | Igari | B60W 30/16 |
| 2021/0284154 | A1* | 9/2021 | Oshida | B60T 8/261 |
| 2021/0309195 | A1* | 10/2021 | Oshida | B60T 8/3225 |
| 2022/0185275 | A1* | 6/2022 | Pfau | B60W 30/16 |
| 2022/0203979 | A1* | 6/2022 | Igari | B60W 50/14 |

FOREIGN PATENT DOCUMENTS

| | | | | |
|---|---|---|---|---|
| CN | 104192146 B | * | 3/2017 | ............ B60W 30/14 |
| DE | 102013226004 A1 | | 6/2014 | |
| DE | 102019215101 A1 | | 4/2021 | |
| EP | 4063216 A1 | | 9/2022 | |
| JP | 2009116882 A | | 5/2009 | |
| JP | 2018134991 A | | 8/2018 | |
| JP | 2019026166 A | | 2/2019 | |
| JP | 2019131130 A | | 8/2019 | |
| KR | 20130130950 A | * | 12/2013 | ............ B60W 30/17 |
| WO | WO-2014029547 A1 | * | 2/2014 | ............ B62D 15/025 |
| WO | WO-2015032508 A1 | * | 3/2015 | ............ B60W 50/10 |
| WO | WO-2020021382 A1 | * | 1/2020 | ............ B60T 8/1706 |
| WO | WO-2020188174 A1 | * | 9/2020 | ............ B60W 50/14 |
| WO | WO-2020234710 A1 | * | 11/2020 | ............ B60W 10/18 |
| WO | 2021099931 A1 | | 5/2021 | |

\* cited by examiner

CONTROLLER AND CONTROL METHOD

BACKGROUND

The present disclosure relates to a controller and a control method capable of improving safety of a lean vehicle.

As a conventional technique related to a lean vehicle such as a motorcycle, a technique of assisting with a rider's operation has been available. For example, a driver assistance system is disclosed in JP 2009-116882 A. The driver assistance system warns the rider of the motorcycle that the motorcycle inappropriately approaches an obstacle based on information detected by a sensor that detects the obstacle present in a travel direction or substantially in the travel direction.

By the way, as the technique of assisting with driving, a cruise control to automatically control a vehicle speed has been available. In particular, as the cruise control, there is control that is executed based on a positional relationship information between an own vehicle and a preceding vehicle so as to secure an inter-vehicular distance between the own vehicle and the preceding vehicle as a safe distance. Here, it is considered to apply such cruise control to the lean vehicle. However, a posture of the lean vehicle is more likely to become unstable than a posture of an automobile having four wheels. For example, the lean vehicle cannot stand upright alone in a stopped state, and is likely to fall over when a speed of the lean vehicle is excessively reduced. For this reason, when the cruise control is applied to the lean vehicle, the speed of the lean vehicle has to be controlled appropriately. Otherwise, the posture of the lean vehicle possibly becomes unstable, which compromises safety.

SUMMARY

The present invention addresses the issues described above, and it is an objective of the present invention to provide a controller and a control method capable of improving safety of a lean vehicle.

As one aspect of the present invention, a controller maneuvers a lean vehicle. The controller includes an execution section that executes a first operation. The first operation is an operation that causes the lean vehicle to execute a cruise control based on a positional relationship information. The positional relationship information is information about a positional relationship between the lean vehicle and a preceding vehicle preceding the lean vehicle. When a specified operation is performed by a rider of the lean vehicle while the first operation is enabled by the rider, the execution section executes a second operation, the second operation is an operation that automatically stops the lean vehicle regardless of the positional relationship information.

As one aspect of the present invention, a control method for maneuvering a lean vehicle includes executing, using an execution section of a controller, a first operation, the first operation that is an operation causing the lean vehicle to execute a cruise control based on a positional relationship information, the positional relationship information that is information about a positional relationship between the lean vehicle and a preceding vehicle preceding the lean vehicle. When a specified operation is performed by a rider of the lean vehicle while the first operation is enabled by the rider, the execution section executes a second operation, the second operation is an operation that automatically stops the lean vehicle regardless of the positional relationship information.

According to the controller and the control method, the controller includes an execution section that executes a first operation. The first operation is an operation that causes the lean vehicle to execute a cruise control based on a positional relationship information. The positional relationship information is information about a positional relationship between the lean vehicle and a preceding vehicle preceding the lean vehicle. When a specified operation is performed by a rider of the lean vehicle while the first operation is enabled by the rider, the execution section executes a second operation, the second operation is an operation that automatically stops the lean vehicle regardless of the positional relationship information. In this way, when it is attempted to stop the lean vehicle during the cruise control, the lean vehicle can be decelerated in line with the rider's intention. Thus, it is possible to prevent the lean vehicle from falling over by the unintended deceleration. Therefore, it is possible to improve safety of the lean vehicle.

DETAILED DESCRIPTION

A description will hereinafter be made on a controller according to the present invention with reference to the drawings.

The following description will be made on the controller that is used for a two-wheeled motorcycle (see a lean vehicle 1 in FIG. 1). However, a vehicle as a control target of the controller according to the present invention only needs to be a lean vehicle, and may be a lean vehicle other than the two-wheeled motorcycle. The lean vehicle means a vehicle, a body of which is tilted to the right when turning in a right direction and is tilted to the left when turning in a left direction. Examples of the lean vehicle are motorcycles (the two-wheeled motor vehicle and a three-wheeled motor vehicle) and pedal-driven vehicles. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are an electrically-assisted pedal-driven vehicle and an electric pedal-driven vehicle.

In addition, a description will hereinafter be made on a case where the engine (more specifically, an engine 11 in FIG. 1, which will be described below) is mounted as a drive source that can output power for driving a wheel. However, as the drive source, a drive source other than the engine (for example, an electric motor) may be mounted, or plural drive sources may be mounted.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Lean Vehicle>

A description will be made on a configuration of the lean vehicle 1 according to an embodiment of the present invention with reference to FIG. 1 and FIG. 2.

Figure 1:
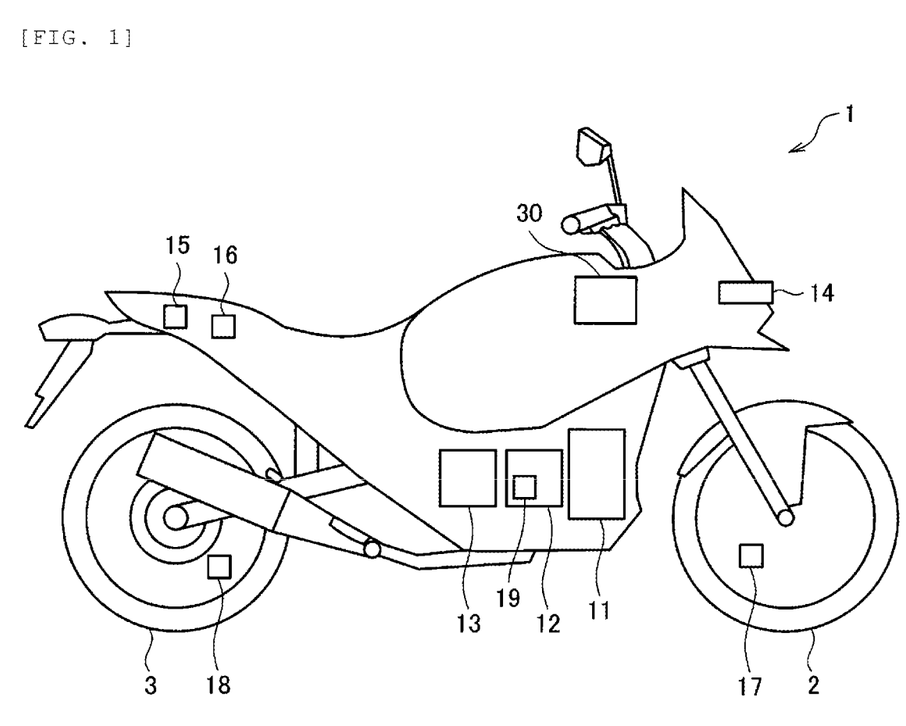
FIG. 1 is a schematic view illustrating an outline configuration of a lean vehicle according to an embodiment of the present invention.

FIG. 1 is a schematic view illustrating an outline configuration of the lean vehicle 1. FIG. 2 is a block diagram illustrating an exemplary functional configuration of a controller 30.

The lean vehicle 1 is a two-wheeled motorcycle that corresponds to an example of the lean vehicle according to the present invention. As illustrated in FIG. 1 and FIG. 2, the lean vehicle 1 includes a front wheel 2, a rear wheel 3, the engine 11, a transmission 12, a hydraulic pressure control unit 13, a surrounding environment sensor 14, an inertial measurement unit (IMU) 15, a seating sensor 16, a front-wheel rotational frequency sensor 17, a rear-wheel rotational frequency sensor 18, a gear position sensor 19, an accelerator operation section 21, a brake operation section 22, a clutch operation section 23, a transmission operation section 24, and the controller (ECU) 30.

The engine 11 corresponds to an example of a drive source of the lean vehicle 1 and can output the power for driving the wheel. For example, the engine 11 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount to the combustion chamber varies according to a throttle opening amount as an opening amount of the throttle valve.

The transmission 12 is a stepped transmission. That is, the transmission 12 has plural gear stages. An input shaft of the transmission 12 is connected to the crankshaft of the engine 11. An output shaft of the transmission 12 is connected to the rear wheel 3. Accordingly, the power that is output from the engine 11 is transmitted to the transmission 12, is changed by the transmission 12, and is then transmitted to the rear wheel 3 as a drive wheel. The rider can make a shift change by performing a gear shift operation while a clutch, which is interposed between the crankshaft of the engine 11 and the input shaft of the transmission 12, is disengaged by a clutch operation.

The hydraulic pressure control unit 13 is a unit that has a function of controlling a braking force to be generated on the wheel. For example, the hydraulic pressure control unit 13 includes components (for example, a control valve and a pump) that are provided to an oil channel connecting a master cylinder and a wheel cylinder and control a brake hydraulic pressure in the wheel cylinder. The braking force to be generated on the wheel is controlled by controlling operation of the components in the hydraulic pressure control unit 13. Here, the hydraulic pressure control unit 13 may control the braking force to be generated on each of the front wheel 2 and the rear wheel 3 or may only control the braking force to be generated on one of the front wheel 2 and the rear wheel 3.

The surrounding environment sensor 14 detects surrounding environment information related to environment around the lean vehicle 1. For example, the surrounding environment sensor 14 is provided to a front portion of a trunk of the lean vehicle 1, and detects the surrounding environment information in front of the lean vehicle 1. The surrounding environment information detected by the surrounding environment sensor 14 is output to the controller 30.

The surrounding environment information that is detected by the surrounding environment sensor 14 may be information about a distance to or an orientation of a target object that is located around the lean vehicle 1 (for example, a relative position, a relative distance, a relative speed, relative acceleration, or the like), or may be a characteristic of the target object that is located around the lean vehicle 1 (for example, a type of the target object, a shape of the target object itself, a mark on the target object, or the like). Examples of the surrounding environment sensor 14 are a radar, a Lidar sensor, an ultrasonic sensor, and a camera.

The surrounding environment information can also be detected by a surrounding environment sensor that is mounted to another vehicle or by an infrastructure facility. That is, the controller 30 can also acquire the surrounding environment information via wireless communication with the other vehicle or the infrastructure facility.

The IMU 15 includes a three-axis gyroscope sensor and a three-directional acceleration sensor, and detects a posture of the lean vehicle 1. The IMU 15 is provided to the trunk of the lean vehicle 1, for example. For example, the IMU 15 detects a lean angle of the lean vehicle 1 and outputs a detection result. The IMU 15 may detect another physical quantity that can substantially be converted to the lean angle of the lean vehicle 1. The lean angle corresponds to an angle representing a tilt in a rolling direction of a body (more specifically, the trunk) of the lean vehicle 1 with respect to an upper vertical direction. The IMU 15 may only include parts of the three-axis gyroscope sensor and the three-directional acceleration sensor.

The seating sensor 16 is provided to a rear seat of the lean vehicle 1 and detects presence or absence of an occupant or a load on a rear seat. The presence or the absence of the occupant on the rear seat is an example of an occupant information of the lean vehicle 1. Here, the occupant information only needs to be information about the occupant of the lean vehicle 1 and can include the number of the occupant in the lean vehicle 1, weight of each of the occupants, and the like, for example. The presence or the absence of the load on the rear seat is an example of a load information of the lean vehicle 1. Here, the load information only needs to be information about the load of the lean vehicle 1. For example, the load information may include the number of the load in the lean vehicle 1, a weight of each of the loads, and the like. That is, the seating sensor 16 corresponds to an example of a sensor that detects the occupant information and the load information of the lean vehicle 1. However, the occupant information or the load information of the lean vehicle 1 may be detected by a sensor (for example, a camera or the like) other than the seating sensor 16.

The front-wheel rotational frequency sensor 17 is a wheel rotational frequency sensor that detects a rotational frequency of the front wheel 2 (for example, a rotational frequency of the front wheel 2 per unit time [rpm], a travel distance of the front wheel 2 per unit time [km/h], or the like), and outputs a detection result. The front-wheel rotational frequency sensor 17 may detect another physical quantity that can substantially be converted to the rotational frequency of the front wheel 2. The front-wheel rotational frequency sensor 17 is provided to the front wheel 2.

The rear-wheel rotational frequency sensor 18 is a wheel rotational frequency sensor that detects a rotational frequency of the rear wheel 3 (for example, the rotational frequency of the rear wheel 3 per unit time [rpm], a travel distance of the rear wheel 3 per unit time [km/h], or the like), and outputs a detection result. The rear-wheel rotational frequency sensor 18 may detect another physical quantity that can substantially be converted to the rotational frequency of the rear wheel 3. The rear-wheel rotational frequency sensor 18 is provided to the rear wheel 3.

The gear position sensor 19 detects at which gear stage the gear stage of the transmission 12 is set, and outputs a detection result. The gear position sensor 19 is provided to the transmission 12, for example.

The accelerator operation section 21 is an operation section that is used by the rider for an accelerator operation. The accelerator operation is an operation to adjust drive power of the lean vehicle 1. For example, the accelerator operation section 21 is an accelerator grip that is provided to a handlebar of the lean vehicle 1, and the accelerator operation is an operation to rotate the accelerator grip.

The brake operation section 22 is an operation section that is used by the rider for a brake operation. The brake operation is an operation to adjust the braking force of the lean vehicle 1. For example, the brake operation section 22 is a brake lever that is provided to the handlebar of the lean vehicle 1, or a brake pedal that is provided to the trunk thereof. The brake operation is an operation to grip the brake lever or an operation to step on the brake pedal.

The clutch operation section 23 is an operation section that is used by the rider for the clutch operation. The clutch operation is an operation to engage or disengage the clutch that is interposed between the crankshaft of the engine 11 and the input shaft of the transmission 12. For example, the clutch operation section 23 is a clutch lever that is provided to the handlebar of the lean vehicle 1, and the clutch operation is an operation to grip the clutch lever.

The transmission operation section 24 is an operation section that is used by the rider for the gear shift operation. The gear shift operation is an operation to switch the gear stage of the transmission 12. For example, the transmission operation section 24 is a shift lever that is provided to the handlebar of the lean vehicle 1, and the gear shift operation is an operation using the shift lever.

The controller 30 maneuvers, i.e., controls behavior of, the lean vehicle 1. For example, the controller 30 is partially or entirely constructed of a microcomputer, a microprocessor unit, or the like. In addition, the controller 30 may partially or entirely be constructed of one whose firmware and the like can be updated, or may partially or entirely be a program module or the like that is executed by a command from a CPU or the like, for example. The controller 30 may be provided as one unit or may be divided into plural units, for example.

Figure 2:
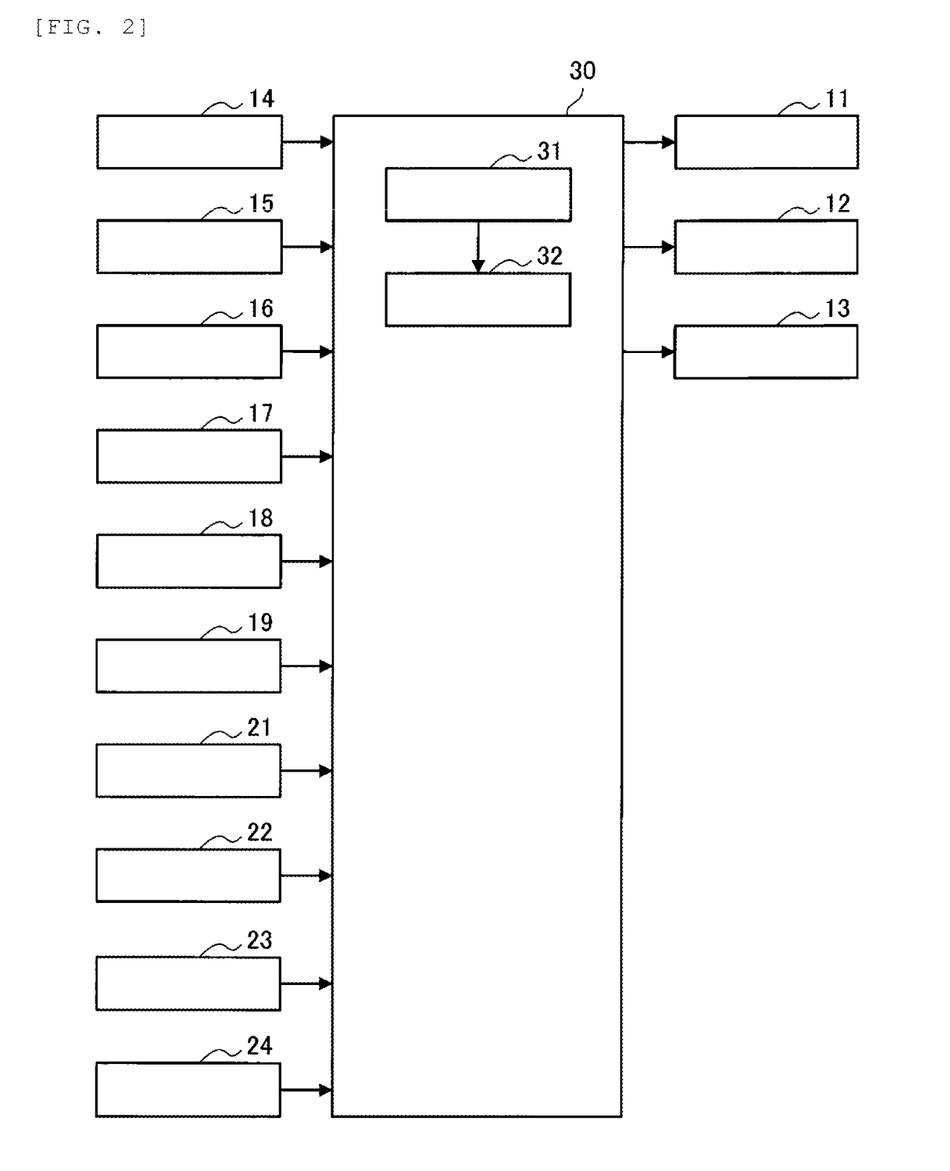
FIG. 2 is a block diagram illustrating an exemplary functional configuration of a controller according to the embodiment of the present invention.

As illustrated in FIG. 2, the controller 30 includes an acquisition section 31 and an execution section 32, for example. In addition, the controller 30 communicates with each of the devices in the lean vehicle 1.

The acquisition section 31 acquires information from each of the devices in the lean vehicle 1, and outputs the acquired information to the execution section 32. For example, the acquisition section 31 acquires the information from the surrounding environment sensor 14, the IMU 15, the seating sensor 16, the front-wheel rotational frequency sensor 17, the rear-wheel rotational frequency sensor 18, the gear position sensor 19, the accelerator operation section 21, the brake operation section 22, the clutch operation section 23, and the transmission operation section 24. In the present specification, the acquisition of the information can include extraction, generation, and the like of the information.

The execution section 32 executes various types of control by controlling operation of each of the devices in the lean vehicle 1. For example, the execution section 32 controls the operation of the engine 11, the transmission 12, and the hydraulic pressure control unit 13.

Here, the lean vehicle 1 can select, as a travel mode, a cruise control mode in which the lean vehicle 1 executes a cruise control. For example, in response to the rider's input operation using an input device of the lean vehicle 1, the execution section 32 sets the travel mode to the cruise control mode. In the cruise control mode, the execution section 32 automatically controls a speed of the lean vehicle 1 without relying on an accelerating/decelerating operation (that is, the accelerator operation and the brake operation) by the rider. For example, the execution section 32 monitors a value of the speed of the lean vehicle 1 that is acquired based on the rotational frequency of the front wheel 2 and the rotational frequency of the rear wheel 3, and can thereby control the speed of the lean vehicle 1 to a target speed.

In addition, in the cruise control mode, the execution section 32 executes, as normal operation, operation to cause the lean vehicle 1 to execute the cruise control based on a positional relationship information. The positional relationship information is information about a relationship between a position of the lean vehicle 1 and a position of a vehicle ahead of the lean vehicle 1. In the normal operation, for example, the execution section 32 determines the target speed based on the positional relationship information, and controls the speed of the lean vehicle 1 to the target speed. The target speed that is determined based on the positional relationship information is such a speed at which an inter-vehicular distance between the lean vehicle 1 and the preceding vehicle is secured to be equal to or longer than a reference distance. The reference distance is such a distance with which safety against a collision with the preceding vehicle is sufficiently secured. Such normal operation optimizes the inter-vehicular distance between the lean vehicle 1 and the preceding vehicle.

For example, the positional relationship information can include information about a relative position, a relative distance, a relative speed, a relative acceleration, or relative jerk of the lean vehicle 1 to the preceding vehicle, and can also include a passing time difference between the lean vehicle 1 and the preceding vehicle, or the like. The positional relationship information may be information about another physical quantity that can substantially be converted to one of these types of the information. For example, the positional relationship information can be acquired based on the detection result by the surrounding environment sensor 14.

<Operation of Controller>

A description will be made on operation of the controller 30 according to the embodiment of the present invention with reference to FIG. 3.

As described above, in the cruise control mode, the execution section 32 of the controller 30 executes, as the normal operation, the operation to cause the lean vehicle 1 to execute the cruise control based on the positional relationship information between the lean vehicle 1 and the vehicle ahead of the lean vehicle 1. Here, when a specified operation is performed by the rider while the normal operation is enabled by the rider of the lean vehicle 1, the execution section 32 executes automatic stop operation. In this way, as will be described below, safety of the lean vehicle 1 can be improved. A description will hereinafter be made on a processing example illustrated in FIG. 3 as an example of processing by the controller 30.

The normal operation is an example of a first operation. The first operation is an operation that causes the lean vehicle 1 to execute the cruise control based on the positional relationship information. The automatic stop operation is an example of a second operation. The second operation is an operation that automatically stops the lean vehicle 1 regardless of, i.e., not based on, the positional relationship information. A speed maintenance operation, which will be described below, is an example of a third operation. The third operation is an operation that causes the lean vehicle 1 to execute the cruise control regardless of the positional relationship information between the lean vehicle 1 and the preceding vehicle. However, as will be described below, the third operation is not limited to the speed maintenance operation.

Figure 3:
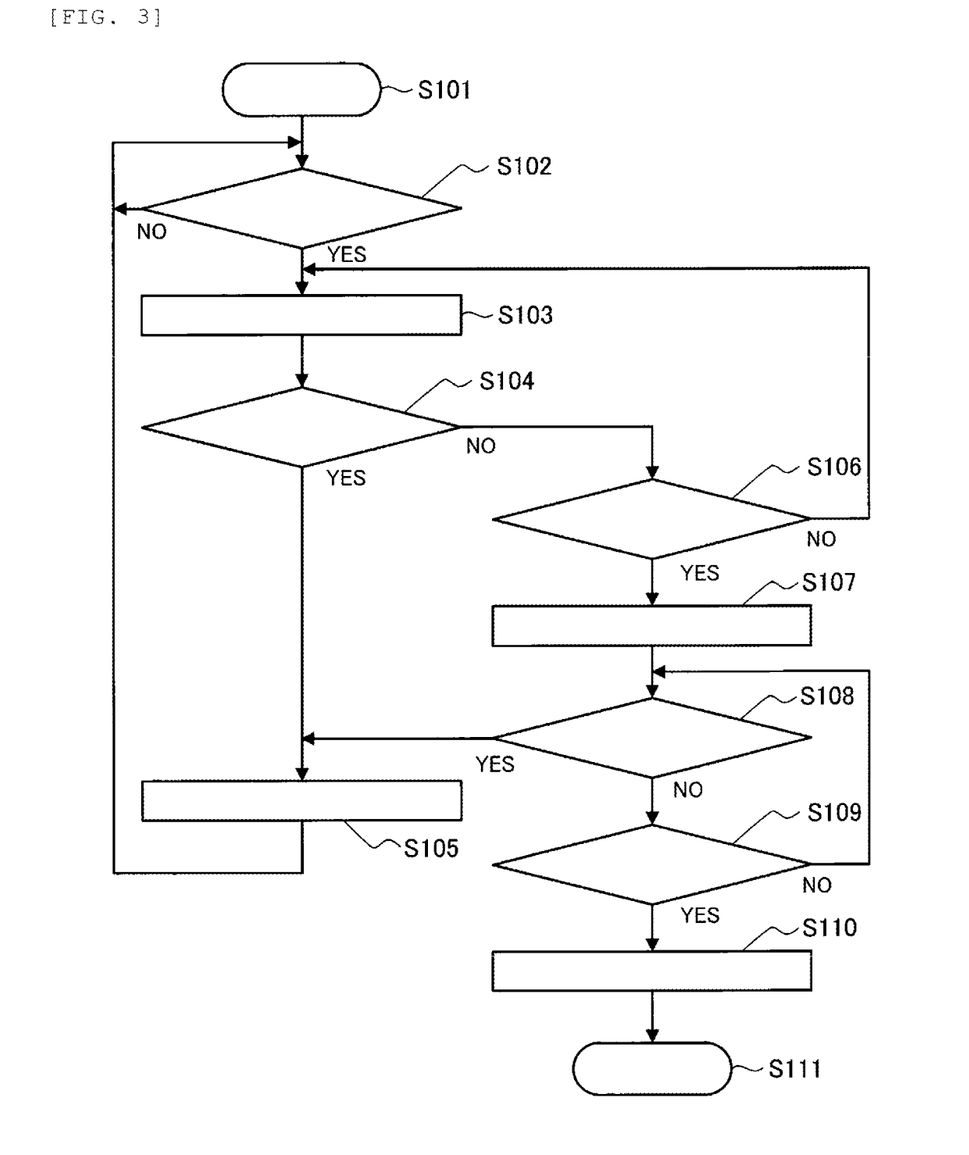
FIG. 3 is a flowchart illustrating an example of a processing procedure that is executed by the controller according to the embodiment of the present invention.

FIG. 3 is a flowchart illustrating an example of a processing procedure that is executed by the controller 30. For example, a control flow illustrated in FIG. 3 is executed when the travel mode is set to the cruise control mode. Step S101 in FIG. 3 corresponds to initiation of the control flow illustrated in FIG. 3. Step S111 in FIG. 3 corresponds to termination of the control flow illustrated in FIG. 3. When the control flow illustrated in FIG. 3 is initiated, the normal operation is being executed.

When the control flow illustrated in FIG. 3 is initiated, in step S102, the execution section 32 determines whether the speed information of the lean vehicle 1 indicates that the lean vehicle 1 is decelerated to the reference speed.

The above speed information may indicate a current speed of the lean vehicle 1 or a future speed of the lean vehicle 1. For example, the above current speed can be acquired based on the rotational frequency of the front wheel 2 and the rotational frequency of the rear wheel 3. For example, the above future speed can be acquired based on history of the rotational frequency of the front wheel 2 and the rotational frequency of the rear wheel 3. However, the above current speed and the above future speed may be acquired based on a travel state information of the preceding vehicle. The travel state information of the preceding vehicle is information about a travel state of the preceding vehicle. The travel state information of the preceding vehicle may include information about a speed, acceleration, or jerk, or the like of the preceding vehicle, for example. For example, the travel state information of the preceding vehicle can be acquired based on the detection result by the surrounding environment sensor 14.

For example, when the lean vehicle 1 is decelerated and the current speed thereof reaches the reference speed, the execution section 32 may determine that the speed information of the lean vehicle 1 indicates that the lean vehicle 1 is decelerated to the reference speed. Alternatively, for example, when the future speed of the lean vehicle 1 is near the reference speed and it is expected that the speed of the lean vehicle 1 is decelerated to the reference speed in the future, the execution section 32 may determine the speed information of the lean vehicle 1 to indicate that the lean vehicle 1 is decelerated to the reference speed.

As will be described below, when the speed information of the lean vehicle 1 indicates that the lean vehicle 1 is decelerated to the reference speed, the speed maintenance operation is executed. Thus, the speed of the lean vehicle 1 is maintained at the reference speed after reaching the reference speed. For example, the reference speed can be set to a lower limit value of a speed range within which the lean vehicle 1 can travel in an upright state without falling over, or can be set to a higher value than the lower limit value. Alternatively, for example, the reference speed can be set to a lower limit value of a speed range within which engine stalling does not occur to the lean vehicle 1, or can be set to a higher value than the lower limit value.

In step S102, when the speed information of the lean vehicle 1 is determined not to indicate that the lean vehicle 1 is decelerated to the reference speed (step S102/NO), step S102 is repeated. On the other hand, in step S102, when the speed information of the lean vehicle 1 is determined to indicate that the lean vehicle 1 is decelerated to the reference speed (step S102/YES), the processing proceeds to step S103. Then, in step S103, the execution section 32 executes the speed maintenance operation.

The speed maintenance operation is the operation to cause the lean vehicle 1 to execute the cruise control regardless of the positional relationship information between the lean vehicle 1 and the preceding vehicle. More specifically, in the speed maintenance operation, the execution section 32 maintains the speed of the lean vehicle 1. For example, after the speed of the lean vehicle 1 reaches the reference speed, the execution section 32 maintains the speed of the lean vehicle 1 by the speed maintenance operation.

As described above, when the speed information of the lean vehicle 1 acquired during the normal operation indicates that the lean vehicle 1 is decelerated to the reference speed, the execution section 32 executes the speed maintenance operation instead of the normal operation.

As will be described below, in the cruise control mode, it is possible to switch the state of executing the operation (for example, the speed maintenance operation or the automatic stop operation) other than the normal operation to the state of executing the normal operation. That is, in the cruise control mode, the normal operation is enabled by the rider. Thus, more specifically, when the speed information of the lean vehicle 1 acquired during the normal operation indicates that the lean vehicle 1 is decelerated to the reference speed while the normal operation is enabled by the rider, the execution section 32 executes the speed maintenance operation instead of the normal operation.

Here, the reference speed may be a value that is set in advance. However, the reference speed may be a value that is changed based on various parameters. That is, the execution section 32 may change the reference speed based on the various parameters.

For example, the execution section 32 may change the reference speed based on gear stage information of the transmission 12. The gear stage information is information about the gear stage of the transmission 12 and includes information about which gear stage the gear stage of the transmission 12 is set, for example. For example, the gear stage information can be acquired from the gear position sensor 19.

The lower limit value of the speed range within which engine stalling does not occur varies by the gear stage of the transmission 12. For this reason, the reference speed is changed based on the gear stage information of the transmission 12. In this way, the reference speed can appropriately be set to the lower limit value of the speed range within which engine stalling does not occur to the lean vehicle 1, or can appropriately be set to the higher value than the lower limit value. Therefore, it is possible to prevent the occurrence of engine stalling in the speed maintenance operation.

In addition, for example, the execution section 32 may change the reference speed based on a travel posture information of the lean vehicle 1. The travel posture information is information about a posture of the lean vehicle 1 while the lean vehicle 1 is traveling. For example, The travel posture information may include a lean angle information that is information about a lean angle of the lean vehicle 1, a yaw rate information that is information about a yaw rate of the lean vehicle 1, a lateral acceleration information that is information about lateral acceleration of the lean vehicle 1, or the like. For example, the travel posture information can be acquired from the IMU 15.

A stability degree of the posture of the lean vehicle 1 varies by the travel posture of the lean vehicle 1. For this reason, the reference speed is changed based on the travel posture information of the lean vehicle 1. In this way, the reference speed can appropriately be set to the lower limit value of the speed range within which the lean vehicle 1 can travel in the upright state without falling over, or can appropriately be set to the higher value than the lower limit value. Therefore, it is possible to prevent the posture of the lean vehicle 1 from becoming unstable in the speed maintenance operation. In particular, likeliness of the lean vehicle 1 to fall over in the rolling direction varies by the lean angle and a lean angular velocity of the lean vehicle 1. Thus, it is possible to appropriately prevent the lean vehicle 1 from falling over in the rolling direction by changing the reference speed based on the lean angle information of the lean vehicle 1.

For example, the execution section 32 may change the reference speed based on a road surface information. The road surface information is information about a road surface on which the lean vehicle 1 travels, and includes a gradient information of the road surface that is information about a degree of a gradient of the road surface, a property information of the road surface that is information about a property of the road surface, or the like, for example. For example, the road surface information can be acquired from the surrounding environment sensor 14. For example, when the camera is used as the surrounding environment sensor 14, an image that is captured by the camera is subjected to image processing. In this way, the road surface information can be acquired.

The stability degree of the posture of the lean vehicle 1 varies by the road surface information. For this reason, the reference speed is changed based on the road surface information. In this way, the reference speed can appropriately be set to the lower limit value of the speed range within which the lean vehicle 1 can travel in the upright state without falling over, or can appropriately be set to the higher value than the lower limit value. Therefore, it is possible to prevent the posture of the lean vehicle 1 from becoming unstable in the speed maintenance operation. In particular, the stability degree of the posture of the lean vehicle 1 varies by whether the road surface on which the lean vehicle 1 travels is an uphill road or a downhill road. Thus, it is possible to appropriately prevent the posture of the lean vehicle 1 from becoming unstable by changing the reference speed based on the gradient information of the road surface.

For example, the execution section 32 may change the reference speed based on at least one of the occupant information and the load information of the lean vehicle 1. For example, the occupant information and the load information can be acquired from the seating sensor 16.

The stability degree of the posture of the lean vehicle 1 varies by the occupant information and the load information of the lean vehicle 1. For this reason, the reference speed is changed based on at least one of the occupant information and the load information of the lean vehicle 1. In this way, the reference speed can appropriately be set to the lower limit value of the speed range within which the lean vehicle 1 can travel in the upright state without falling over, or can appropriately be set to the higher value than the lower limit value. Therefore, it is possible to prevent the posture of the lean vehicle 1 from becoming unstable in the speed maintenance operation.

The parameters that are used to change the reference speed are not limited to the above examples. That is, the execution section 32 may change the reference speed based on a parameter other than the above-exemplified parameters. In addition, the execution section 32 may change the reference speed based on plural types of the parameters. The execution section 32 may extract plural candidates for the reference speed based on the plural types of the parameters, and may then determine one of the plural candidates as the reference speed. In this case, preferably, the execution section 32 preferentially determines the candidate at the high speed as the reference speed.

Following step S103, in step S104, the execution section 32 determines whether a switching condition between the normal operation and the speed maintenance operation is satisfied. If it is determined that the switching condition is satisfied (step S104/YES), the processing proceeds to step S105. In step S105, the execution section 32 executes the normal operation instead of the speed maintenance operation, and the processing returns to step S102.

For example, the switching condition may be a condition that the travel state information of the preceding vehicle is information indicating that the preceding vehicle is in an accelerated state. That is, when the travel state information of the preceding vehicle that is acquired during the speed maintenance operation is the information indicating that the preceding vehicle is in the accelerated state, the execution section 32 may execute the normal operation instead of the speed maintenance operation. The accelerated state not only includes a state where the acceleration continues for a specified time period but can also include a state where a time average of the acceleration in the specified time period is a positive value even when deceleration partially occurs in the specified time period, a state where the acceleration is increased over time when values of the acceleration at two time points are compared, or the like.

In addition, for example, the switching condition may be a condition that an accelerator state information indicates the accelerator operation section 21 is operated by the rider. That is, when the accelerator state information acquired during the speed maintenance operation indicates that the accelerator operation section 21 is operated, the execution section 32 may execute the normal operation instead of the speed maintenance operation. For example, the accelerator state information is information about an operation state of the accelerator operation section 21 by the rider, i.e., information about whether the accelerator operation section 21 is operated by the rider. The accelerator state information can be acquired from the accelerator operation section 21, for example.

When the accelerator operation section 21 is the accelerator grip, the state where the accelerator operation section 21 is operated not only includes a state where an operation to rotate the accelerator grip in a counterclockwise direction (that is, a direction in which drive power generated to the lean vehicle 1 is increased) is performed from an unloaded state but can also include a state where an operation to rotate the accelerator grip in a clockwise direction as a reverse direction of the counterclockwise direction is performed from the unloaded state.

Here, the speed maintenance operation may be switched to the normal operation immediately after the above switching condition is satisfied or after certain duration of time elapses from a time point at which the above switching condition is satisfied. For example, when the speed maintenance operation is switched to the normal operation based on the accelerator state information, the execution section 32 may switch the speed maintenance operation to the normal operation after the speed of the lean vehicle 1 is increased with the accelerator operation and the speed of the lean vehicle 1 reaches a higher speed than the reference speed to some degree.

When the execution section 32 executes the normal operation instead of the speed maintenance operation, the execution section 32 may use a setting information. The setting information is information about a setting set by the rider in the last normal operation that has been executed before the speed maintenance operation is executed. The setting information can include various types of the information that are used in the cruise control mode. For example, the setting information can include an upper limit value of the speed of the lean vehicle 1 in the cruise control mode, various parameters for determining the target speed of the lean vehicle 1, or the like.

If it is determined in step S104 that the switching condition is not satisfied (step S104/NO), the processing proceeds to step S106. In step S106, the execution section 32 determines whether a specified operation is performed by the rider.

If it is determined in step S106 that the specified operation is not performed by the rider (step S106/NO), the processing returns to step S103. On the other hand, if it is determined in step S106 that the specified operation is performed by the rider (step S106/YES), the processing proceeds to step S107. In step S107, the execution section 32 initiates the automatic stop operation.

The automatic stop operation is the operation to automatically stop the lean vehicle 1 regardless of the positional relationship information between the lean vehicle 1 and the preceding vehicle. More specifically, in the automatic stop operation, the execution section 32 decelerates and stops the lean vehicle 1. Here, in the automatic stop operation, the execution section 32 controls the deceleration, which is generated to the lean vehicle 1, regardless of the positional relationship information.

As described above, when the specified operation is performed by the rider while the normal operation is enabled by the rider of the lean vehicle 1, the execution section 32 executes the automatic stop operation. The above specified operation can be any of various operations.

For example, the above specified operation can include an operation using the brake operation section 22 that is used for the brake operation by the rider. An example of the specified operation using the brake operation section 22 is an operation of the brake operation section 22 with an operation amount to such extent that the braking force is substantially and hardly generated to the lean vehicle 1.

For example, the above specified operation can include an operation using the accelerator operation section 21 that is used for the accelerator operation by the rider. An example of the specified operation using the accelerator operation section 21 is the operation to rotate the accelerator grip in the clockwise direction as the reverse direction of the counter-clockwise direction (that is, the direction in which the drive power generated to the lean vehicle 1 is increased) from the unloaded state.

For example, the above specified operation can include an operation using the clutch operation section 23 that is used for the clutch operation by the rider. An example of the specified operation using the clutch operation section 23 is the operation to disengage the clutch that is interposed between the crankshaft of the engine 11 and the input shaft of the transmission 12.

For example, the above specified operation can include an operation using the transmission operation section 24 that is used for the gear shift operation by the rider. An example of the specified operation using the transmission operation section 24 is a shift down operation to shift down the gear stage of the transmission 12 by one stage.

However, the above specified operation is not limited to the above examples. For example, the above specified operation may be an operation using any of the above operation sections but differing from the above-described examples. In addition, for example, the above specified operation may be an operation using a different operation section from any of the above operation sections. Furthermore, for example, the above specified operation may be an operation using a dedicated operation section for executing the automatic stop operation. Moreover, for example, the above specified operation may be an operation using the plural operation sections.

In the automatic stop operation, for example, the execution section 32 controls the deceleration, which is generated to the lean vehicle 1, to deceleration, which is set in advance. In this case, the rider can easily predict the behavior of the lean vehicle 1 in the automatic stop operation. Thus, the behavior of the lean vehicle 1 is likely to be in line with the rider's intention.

Here, in the automatic stop operation, the execution section 32 may change the deceleration, which is generated to the lean vehicle 1, based on any of the various parameters.

For example, in the automatic stop operation, the execution section 32 may change the deceleration, which is generated to the lean vehicle 1, based on the travel state information of the preceding vehicle. The inter-vehicular distance between the lean vehicle 1 and the preceding vehicle is likely to be reduced according to the travel state of the preceding vehicle. Therefore, in the automatic stop operation, it is possible to prevent the inter-vehicular distance between the lean vehicle 1 and the preceding vehicle from becoming excessively short by changing the deceleration, which is generated to the lean vehicle 1, based on the travel state information of the preceding vehicle. For example, when the speed of the preceding vehicle is excessively low, it is possible to prevent the inter-vehicular distance between the lean vehicle 1 and the preceding vehicle from becoming excessively short by increasing the deceleration that is generated to the lean vehicle 1.

For example, in the automatic stop operation, the execution section 32 may change the deceleration, which is generated to the lean vehicle 1, based on the travel posture information of the lean vehicle 1. A stability degree of the posture of the lean vehicle 1 varies by the travel posture of the lean vehicle 1. Therefore, in the automatic stop operation, it is possible to prevent the posture of the lean vehicle 1 from becoming unstable by changing the deceleration, which is generated to the lean vehicle 1, based on the travel posture information of the lean vehicle 1. In particular, in the automatic stop operation, it is possible to appropriately prevent the lean vehicle 1 from falling over in the rolling direction by changing the deceleration, which is generated to the lean vehicle 1, based on the lean angle information of the lean vehicle 1.

For example, in the automatic stop operation, the execution section 32 may change the deceleration, which is generated to the lean vehicle 1, based on the road surface information. The stability degree of the posture of the lean vehicle 1 varies by the road surface information. Therefore, in the automatic stop operation, it is possible to prevent the posture of the lean vehicle 1 from becoming unstable by changing the deceleration, which is generated to the lean vehicle 1, based on the road surface information. In particular, in the automatic stop operation, it is possible to appropriately prevent the posture of the lean vehicle 1 from becoming unstable by changing the deceleration, which is generated to the lean vehicle 1, based on the gradient information of the road surface.

In the automatic stop operation, the execution section 32 may change a stop position of the lean vehicle 1 based on the road surface information. For example, the execution section 32 appropriately controls the engine 11 and the hydraulic pressure control unit 13 and can thereby adjust the stop position of the lean vehicle 1 in a front-rear direction. For example, based on the road surface information, the execution section 32 evaluates a degree of danger at the time when the rider's feet touch the road surface at each of plural positions in the front-rear direction on the road surface. Then, the execution section 32 adjusts the stop position of the lean vehicle 1 in a manner to reduce the above degree of danger at the stop position of the lean vehicle 1 to be lower than a standard. In this way, it is possible to stabilize a stopped posture of the lean vehicle 1 at a stop. Therefore, it is possible to prevent the lean vehicle 1 and the rider from falling over.

For example, in the automatic stop operation, the execution section 32 may change the deceleration, which is generated to the lean vehicle 1, based on the speed of the lean vehicle 1. The stability degree of the posture of the lean vehicle 1 varies by the speed of the lean vehicle 1. Therefore, in the automatic stop operation, it is possible to prevent the posture of the lean vehicle 1 from becoming unstable by changing the deceleration, which is generated to the lean vehicle 1, based on the speed of the lean vehicle 1. For example, when the speed of the lean vehicle 1 is excessively low (for example, near 0 km/h), the deceleration, which is generated to the lean vehicle 1, is reduced. In this way, it is possible to appropriately prevent the posture of the lean vehicle 1 from becoming unstable.

For example, in the automatic stop operation, the execution section 32 may change the deceleration, which is generated to the lean vehicle 1, based on at least one of the occupant information and the load information of the lean vehicle 1. The stability degree of the posture of the lean vehicle 1 varies by the occupant information and the load information of the lean vehicle 1. Therefore, in the automatic stop operation, it is possible to prevent the posture of the lean vehicle 1 from becoming unstable by changing the deceleration, which is generated to the lean vehicle 1, based on at least one of the occupant information and the load information of the lean vehicle 1.

In the automatic stop operation, the parameters that are used to change the deceleration generated to the lean vehicle 1 are not limited to the above examples. That is, in the automatic stop operation, the execution section 32 may change the deceleration, which is generated to the lean vehicle 1, based on a parameter other than the above-exemplified parameters. In addition, in the automatic stop operation, the execution section 32 may change the deceleration, which is generated to the lean vehicle 1, based on the plural types of the parameters.

Following step S107, in step S108, the execution section 32 determines whether the accelerator state information indicates that the accelerator operation section 21 is operated. When the accelerator state information is determined to indicate that the accelerator operation section 21 is operated (step S108/YES), the processing proceeds to step S105. In step S105, the execution section 32 executes the normal operation instead of the automatic stop operation, and the processing returns to step S102.

As it has been described above, when the accelerator state information acquired during the automatic stop operation indicates that the accelerator operation section 21 is operated, the execution section 32 executes the normal operation instead of the automatic stop operation. When the accelerator operation section 21 is the accelerator grip, the state where the accelerator operation section 21 is operated not only includes a state where an operation to rotate the accelerator grip in a counterclockwise direction (that is, a direction in which drive power generated to the lean vehicle 1 is increased) is performed from an unloaded state but can also include a state where an operation to rotate the accelerator grip in a clockwise direction as a reverse direction of the counterclockwise direction is performed from the unloaded state.

Here, the automatic stop operation may be switched to the normal operation immediately after it is determined YES in step S108 or after certain duration of time elapses from a time point at which it is determined YES in step S108. For example, the execution section 32 may switch the automatic stop operation to the normal operation after the speed of the lean vehicle 1 is increased with the accelerator operation and the speed of the lean vehicle 1 reaches the reference speed or the higher speed than the reference speed to some degree.

When the execution section 32 executes the normal operation instead of the automatic stop operation, the execution section 32 may use the setting information that is information about the setting set by the rider in the last normal operation that has been executed before the automatic stop operation is executed. As described above, the setting information can include the various types of the information that are used in the cruise control mode.

In step S108, when the accelerator state information is determined not to indicate that the accelerator operation section 21 is operated (step S108/NO), the processing proceeds to step S109. In step S109, the execution section 32 determines whether the lean vehicle 1 is stopped.

If it is determined in step S109 that the lean vehicle 1 is not stopped (step S109/NO), the processing returns to step S108. On the other hand, if it is determined in step S109 that the lean vehicle 1 is stopped (step S109/YES), the processing proceeds to step S110. In step S110, the execution section 32 terminates the automatic stop operation. Then, the control flow illustrated in FIG. 3 is terminated.

After the lean vehicle 1 is stopped by the automatic stop operation, the lean vehicle 1 is supported with the rider's feet touching the road surface. Then, when the rider performs the accelerator operation, i.e., when the accelerator state information indicates that the accelerator operation section 21 is operated, the execution section 32 restarts and reaccelerates the lean vehicle 1 in response to the accelerator operation. Then, after the speed of the lean vehicle 1 reaches the reference speed or the higher speed than the reference speed to some degree, the execution section 32 executes the normal operation. In this way, the lean vehicle 1 can be stopped and restarted in the cruise control mode without performing an operation to cancel the cruise control mode. When an operation using the operation section other than the accelerator operation section 21 is performed after the lean vehicle 1 is stopped by the automatic stop operation, the execution section 32 may restart the lean vehicle 1.

The description has been made so far on the processing example by the controller 30 with reference to the flowchart in FIG. 3. However, the processing executed by the controller 30 is not limited to the above example. For example, as will be described below, a change may be made to a part of the processing that has been described above, or additional processing may be executed for the processing that has been described above.

The above description has been made on the example in which the automatic stop operation is executed when the rider performs the specified operation during the speed maintenance operation. However, the execution section 32 may execute the automatic stop operation when the rider performs the specified operation during the normal operation.

When collision possibility information of the lean vehicle 1 that is acquired during the speed maintenance operation is information indicating that a collision possibility of the lean vehicle 1 exceeds a standard, the execution section 32 may execute operation to apply automatic emergency braking to the lean vehicle 1 instead of the speed maintenance operation. The collision possibility information is information about the collision possibility of the lean vehicle 1 and can be acquired from the surrounding environment sensor 14, for example. The automatic emergency braking is control to generate, to the lean vehicle 1, the deceleration at which the lean vehicle 1 can avoid the collision with an obstacle such as the preceding vehicle.

The execution section 32 may execute an operation to continue applying the braking force to the lean vehicle 1 after the lean vehicle 1 is stopped by the automatic stop operation. In such operation, the execution section 32 applies the braking force to the lean vehicle 1 without relying on the brake operation by the rider. In this way, the lean vehicle 1 remains at the stop position and is thereby prevented from moving in the front-rear direction.

The above description has been made on the example in which the speed maintenance operation is executed as the example of the third operation. However, the third operation is not limited to the speed maintenance operation. The third operation only needs to be operation to cause the lean vehicle 1 to execute the cruise control regardless of the positional relationship information between the lean vehicle 1 and the preceding vehicle. For example, the second operation may be operation to control the speed of the lean vehicle 1 to fall within the specified speed range including the reference speed.

<Effects of Controller>

A description will be made on effects of the controller 30 according to the embodiment of the present invention.

When the specified operation is performed by the rider while the first operation (e.g., the normal operation), is enabled by the rider of the lean vehicle 1, the execution section 32 of the controller 30 executes the second operation (e.g., the automatic stop operation) as the operation to automatically stop the lean vehicle 1 regardless of the positional relationship information. The first operation is the operation that causes the lean vehicle 1 to execute the cruise control based on the positional relationship information between the lean vehicle 1 and the preceding vehicle. In this way, when it is attempted to stop the lean vehicle 1 during the cruise control, the lean vehicle 1 can be decelerated in line with the rider's intention. Thus, it is possible to prevent the lean vehicle 1 from falling over by the unintended deceleration. Therefore, it is possible to improve the safety of the lean vehicle 1.

Preferably, according to the controller 30 of the present invention, the specified operation includes the operation using the brake operation section 22 that is used for the brake operation by the rider. In this way, the lean vehicle 1 is further appropriately decelerated in line with the rider's intention by the simple and intuitive operation.

Preferably, according to the controller 30 of the present invention, the specified operation includes the operation using the accelerator operation section 21 that is used for the accelerator operation by the rider. In this way, the lean vehicle 1 is further appropriately decelerated in line with the rider's intention by a simple and intuitive operation.

Preferably, according to the controller 30 of the present invention, the specified operation includes the operation using the clutch operation section 23 that is used for the clutch operation by the rider. In this way, the lean vehicle 1 is further appropriately decelerated in line with the rider's intention by the simple and intuitive operation.

Preferably, according to the controller 30 of the present invention, the specified operation includes the operation using the transmission operation section 24 that is used for the gear shift operation by the rider. In this way, the lean vehicle 1 is further appropriately decelerated in line with the rider's intention by the simple and intuitive operation.

Preferably, in the second operation, the execution section 32 of the controller 30 changes the deceleration, which is generated to the lean vehicle 1, based on the travel state information of the preceding vehicle. In this way, in the second operation, it is possible to prevent the inter-vehicular distance between the lean vehicle 1 and the preceding vehicle from becoming excessively short.

Preferably, in the second operation, the execution section 32 of the controller 30 changes the deceleration, which is generated to the lean vehicle 1, based on the travel posture information of the lean vehicle 1. In this way, in the second operation, it is possible to prevent the posture of the lean vehicle 1 from becoming unstable.

Preferably, in the second operation, the execution section 32 of the controller 30 changes the deceleration, which is generated to the lean vehicle 1, based on the road surface information. In this way, in the second operation, it is possible to prevent the posture of the lean vehicle 1 from becoming unstable.

Preferably, in the second operation, the execution section 32 of the controller 30 changes the stop position of the lean vehicle 1 based on the road surface information. In this way, in the second operation, it is possible to further appropriately prevent the posture of the lean vehicle 1 from becoming unstable.

Preferably, in the second operation, the execution section 32 of the controller 30 changes the deceleration, which is generated to the lean vehicle 1, based on at least one of the occupant information and the load information of the lean vehicle 1. In this way, in the second operation, it is possible to prevent the posture of the lean vehicle 1 from becoming unstable.

Preferably, according to the controller 30 of the present invention, the execution section 32 executes the operation to continue applying the braking force to the lean vehicle 1 after the lean vehicle 1 is stopped by the second operation. In this way, in the second operation, it is possible to prevent the posture of the lean vehicle 1 from becoming unstable after the lean vehicle 1 is stopped.

Preferably, when the accelerator state information acquired during the second operation indicates that the accelerator operation section 21 is operated, the execution section 32 of the controller 30 executes the first operation instead of the second operation. As a result, the accelerator operation is performed. In addition, when the speed of the lean vehicle 1 becomes higher than the reference speed, the second operation is appropriately switched to the first operation.

Preferably, when the execution section 32 executes the first operation instead of the second operation, the execution section 32 of the controller 30 uses the setting information that is information about the setting set by the rider in the last first operation that has been executed before the second operation is executed. As a result, when the first operation is executed after the second operation is executed, it is possible to prevent the rider from feeling a sense of discomfort, which is caused by a change in the behavior of the lean vehicle 1 from the last first operation that has been executed before execution of the second operation.

Preferably, when the speed information of the lean vehicle 1 acquired during the first operation indicates that the lean vehicle 1 is decelerated to the reference speed, the execution section 32 of the controller 30 executes, instead of the first operation, the third operation (for example, the speed maintenance operation in the above example) as the operation to cause the lean vehicle 1 to execute the cruise control regardless of the positional relationship information. More specifically, when the speed information of the lean vehicle 1 acquired during the first operation indicates that the lean vehicle 1 is decelerated to the reference speed while the first operation is enabled by the rider, the execution section 32 executes the third operation instead of the first operation.

In this way, it is possible to prevent the speed of the lean vehicle 1 from being reduced excessively by the cruise control. For example, when the cruise control is executed based on the positional relationship information while the lean vehicle 1 is decelerated to the reference speed, there is a possibility that the speed of the lean vehicle 1 becomes much lower than the reference speed and the posture of the lean vehicle 1 becomes unstable. Meanwhile, when the lean vehicle 1 executes the cruise control regardless of the positional relationship information while the lean vehicle 1 is decelerated to the reference speed, it is possible to prevent the speed of the lean vehicle 1 from becoming much lower than the reference speed and thus to prevent the posture of the lean vehicle 1 from becoming unstable. In this way, it is possible to prevent the lean vehicle 1 from falling over. Therefore, it is possible to further appropriately improve the safety of the lean vehicle 1.

Preferably, when the travel state information of the preceding vehicle that is acquired during the third operation is the information indicating that the preceding vehicle is in the accelerated state, the execution section 32 of the controller 30 executes the first operation instead of the third operation. As a result, when the preceding vehicle is in the accelerated state, the cruise control is executed based on the positional relationship information. Therefore, the inter-vehicular distance between the lean vehicle 1 and the preceding vehicle is appropriately controlled.

Preferably, when the accelerator state information acquired during the third operation indicates that the accelerator operation section 21 is operated by the rider, the execution section 32 of the controller 30 executes the first operation instead of the third operation. As a result, the accelerator operation is performed. In addition, when the speed of the lean vehicle 1 becomes higher than the reference speed, the third operation is appropriately switched to the first operation.

Preferably, when the execution section 32 executes the first operation instead of the third operation, the execution section 32 of the controller 30 uses the setting information that is information about the setting set by the rider in the last first operation that has been executed before the third operation is executed. As a result, when the first operation is executed after execution of the third operation, it is possible to prevent the rider from feeling the sense of discomfort, which is caused by the change in the behavior of the lean vehicle 1 from the last first operation that has been executed before execution of the third operation.

Preferably, according to the controller 30 of the present invention, the execution section 32 changes the reference speed based on the gear stage information of the transmission 12. In this way, in the third operation, it is possible to prevent the occurrence of engine stalling.

Preferably, according to the controller 30 of the present invention, the execution section 32 changes the reference speed based on the travel posture information of the lean vehicle 1. In this way, in the third operation, it is possible to prevent the posture of the lean vehicle 1 from becoming unstable.

Preferably, the travel posture information includes the lean angle information of the lean vehicle 1. As a result, the reference speed can be changed based on the lean angle information of the lean vehicle 1. Therefore, in the third operation, it is possible to further appropriately prevent the posture of the lean vehicle 1 from becoming unstable.

Preferably, according to the controller 30 of the present invention, the execution section 32 changes the reference speed based on the road surface information. In this way, in the third operation, it is possible to prevent the posture of the lean vehicle 1 from becoming unstable.

Preferably, the road surface information includes the gradient information of the road surface. In this way, it is possible to change the reference speed based on the gradient information of the road surface. Therefore, in the third operation, it is possible to further appropriately prevent the posture of the lean vehicle 1 from becoming unstable.

Preferably, the execution section 32 changes the reference speed based on at least one of the occupant information and the load information of the lean vehicle 1. In this way, in the third operation, it is possible to prevent the posture of the lean vehicle 1 from becoming unstable.

Preferably, when the collision possibility information of the lean vehicle 1 that is acquired during the third operation is the information indicating that the collision possibility of the lean vehicle 1 exceeds the standard, the execution section 32 executes the operation to apply the automatic emergency braking to the lean vehicle 1 instead of the third operation. In this way, when the collision possibility of the lean vehicle 1 exceeds the standard during the third operation, it is possible to appropriately prevent the collision between the lean vehicle 1 and the obstacle such as the preceding vehicle.

The present invention is not limited to the embodiment that has been described. For example, only a part of the embodiment may be implemented.

REFERENCE SIGNS LIST

1: Lean vehicle
2: Front wheel

3: Rear wheel
11: Engine
12: Transmission
13: Hydraulic pressure control unit
14: Surrounding environment sensor
15: Inertial measurement unit
16: Seating sensor
17: Front-wheel rotational frequency sensor
18: Rear-wheel rotational frequency sensor
19: Gear position sensor
21: Accelerator operation section
22: Brake operation section
23: Clutch operation section
24: Gear shift operation section
30: Controller
31: Acquisition section
32: Execution section

The invention claimed is:

1. A controller (30) configured to maneuver a lean vehicle (1), the controller comprising:
an execution section (32) configured to execute a first operation, wherein the first operation is an operation causing the lean vehicle (1) to execute a cruise control based on a positional relationship information, the positional relationship information that is information about a positional relationship between the lean vehicle (1) and a preceding vehicle preceding the lean vehicle (1), wherein when a specified operation is performed by a rider of the lean vehicle (1) while the first operation is enabled by the rider, the execution section (32) executes a second operation, the second operation is an operation that automatically decelerates and stops the lean vehicle (1) regardless of the positional relationship information when the lean vehicle (1) decelerates to a reference speed, wherein the reference speed is a lower limit value of a speed range within which the lean vehicle (1) can travel in an upright state without falling over.

2. The controller according to claim 1, wherein the specified operation includes an operation using a brake operation section (22) that is used for a brake operation by the rider.

3. The controller according to claim 1, wherein the specified operation includes an operation using an accelerator operation section (21) that is used for an accelerator operation by the rider.

4. The controller according to claim 1, wherein the specified operation includes an operation using a clutch operation section (23) that is used for a clutch operation by the rider.

5. The controller according to claim 4, wherein the specified operation includes an operation using a gear shift operation section (24) that is used for a gear shift operation by the rider.

6. The controller according to claim 1, wherein in the second operation, the execution section (32) changes deceleration, which is generated to the lean vehicle (1), based on a travel state information of the preceding vehicle.

7. The controller according to claim 1, wherein in the second operation, the execution section (32) changes the deceleration, which is generated to the lean vehicle (1), based on a travel posture information of the lean vehicle (1).

8. The controller according to claim 1, wherein in the second operation, the execution section (32) changes the deceleration, which is generated to the lean vehicle (1), based on a road surface information.

9. The controller according to claim 8, wherein in the second operation, the execution section (32) changes a stop position of the lean vehicle (1) based on the road surface information.

10. The controller according to claim 1, wherein in the second operation, the execution section (32) changes the deceleration, which is generated to the lean vehicle (1), based on at least one of an occupant information and a load information of the lean vehicle (1).

11. The controller according to claim 1, wherein the execution section (32) executes an operation that continues applying a braking force to the lean vehicle (1) after the lean vehicle (1) is stopped by the second operation.

12. The controller according to claim 3, wherein when an accelerator state information acquired during the second operation indicates that the accelerator operation section (21) is operated, the execution section (32) executes the first operation instead of the second operation, the accelerator state information is information about an operation state of the accelerator operation section (21) by the rider.

13. The controller according to claim 12, wherein when the execution section (32) executes the first operation instead of the second operation, the execution section (32) uses a setting information that is information about a setting set by the rider in the last first operation that has been executed before the second operation is executed.

14. The controller according to claim 1, wherein when a speed information of the lean vehicle (1), which is acquired during the first operation while the first operation is enabled by the rider, indicates that the lean vehicle (1) is decelerated to the reference speed, the execution section (32) executes a third operation instead of the first operation, the third operation is an operation that causes the lean vehicle (1) to execute the cruise control regardless of the positional relationship information.

15. A control method for maneuvering a lean vehicle (1), the control method comprising:
executing, using an execution section (32) of a controller (30), a first operation, the first operation that is an operation causing the lean vehicle (1) to execute a cruise control based on a positional relationship information, the positional relationship information that is information about a positional relationship between the lean vehicle (1) and a preceding vehicle preceding the lean vehicle (1), wherein when a specified operation is performed by a rider of the lean vehicle (1) while the first operation is enabled by the rider, the execution section (32) executes a second operation, the second operation is an operation that automatically decelerates and stops the lean vehicle (1) regardless of the positional relationship information when the lean vehicle (1) decelerates to a reference speed, wherein the reference speed is a lower limit value of a speed range within which the lean vehicle (1) can travel in an upright state without falling over.

16. The controller according to claim 1, wherein the execution section (32) is further configured to:
change the reference speed based on a road surface information detected by an environmental sensor (14) electrically connected to the controller.

17. The controller according to claim 16, wherein the road surface information includes a gradient information of a road surface.

18. The controller according to claim 1, wherein the execution section (32) is further configured to:

change the reference speed based on a travel posture information of the lean vehicle (1) detected by an inertial measurement unit (IMU) (15) electrically connected to the controller.

19. The controller according to claim 1, wherein the execution section (32) is further configured to:
change the reference speed based on a load information of the lean vehicle (1) detected by a seating sensor (16) electrically connected to the controller.

20. The controller according to claim 1, wherein the execution section (32) is further configured to:
change the reference speed based on gear stage information of a transmission (12) detected by a gear position sensor (19) electrically connected to the controller.

* * * * *